Figure 1:
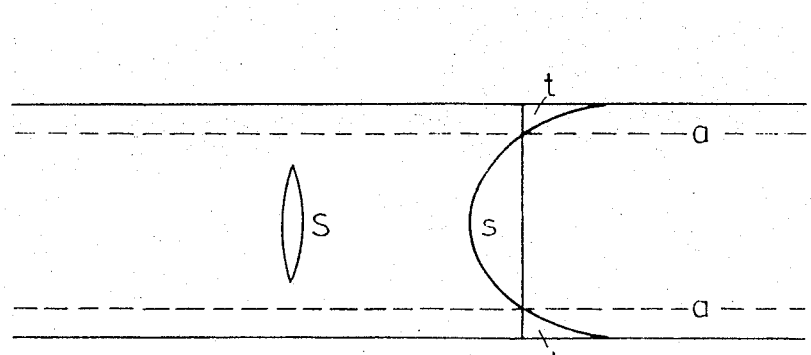

United States Patent [19]
Jebens

[11] 3,758,652
[45] Sept. 11, 1973

[54] FORMING COOLING CHANNELS IN HOT THERMALLY BLOATED CERAMIC BLOCK TO FACILITATE COOLING

[75] Inventor: Aksel Jebens, Hosle, Norway

[73] Assignee: Sentralinstitutt for industriell forskning, Oslo, Norway

[22] Filed: May 13, 1971

[21] Appl. No.: 142,993

[30] Foreign Application Priority Data
May 15, 1970 Norway.................................. 1873

[52] U.S. Cl.......................... 264/43, 65/22, 264/42, 264/44, 264/67
[51] Int. Cl. ...................... C04b 21/02, C04b 41/02
[58] Field of Search .................... 264/43, 67; 65/22, 65/42, 44

[56] References Cited
UNITED STATES PATENTS
3,056,184  10/1962  Blaha...................................... 65/22
1,960,571  5/1934  Butterworth et al.................. 264/43

*Primary Examiner*—John H. Miller
*Attorney*—Wenderoth, Lind & Ponack

[57] ABSTRACT

To facilitate more rapid cooling while avoiding cracking in thermally bloated ceramic block, such as foamed clay, glass, slag, etc. channels are drilled through the block after the surface has solidified and cooling air is then blown through these channels in a controlled manner.

6 Claims, 3 Drawing Figures

Patented Sept. 11, 1973 3,758,652

AKSEL JEBENS,
INVENTOR
BY
ATTORNEYS
ATTORNEY

FORMING COOLING CHANNELS IN HOT THERMALLY BLOATED CERAMIC BLOCK TO FACILITATE COOLING

This invention relates to a method for producing elements of inorganic foam materials, in particular to a method for preventing crack formations in elements of inorganic foam materials when applying raw materials such as a clay containing material, glass powder or aggregates thereof, slag, flotation waste and similar expandable materials. Such elements are especially applicable as building or insulating materials, and are produced by charging e.g. pellets, granules or powder in a form, on a conveyor or in a conveyed form. The pellets may natively contain, or may be admixed with, an expanding agent which either alone or by reaction with the material liberates gas as the material is melting, whereby a high-viscous foam is formed, which can be stabilized by cooling.

Two different methods for producing such foam elements are previously known, of which the one concerns one batch charging in the form and thereafter heating until expansion occurs, as described in U.S. Pat. Nos. 1.845.350 and 1.858.499, and the other method concerns successive deposition of pellet layers in the form during continuous heat supply as described in e.g. U.S. Pat. Nos. 1.877.137 and 1.882.082. The present invention is applicable in connection with both of these methods.

A particular practicable foam element of the type which can be produced by these methods, is foam clay, and in the following, the invention will be described with reference to such materials only, because it will be understood that any inorganic material which can be melted together and expanded similar to clay, can be used.

However, such elements have hitherto not been employed, probably because it has not been possible to produce elements without cracks during an economically acceptable cooling period. During applicants experiments, it has often appeared that such elements crack even after very slow cooling.

This invention is related to that part of the production process which conerns the cooling problems, and procures a relatively simple and practical method for solution of the previous difficulties.

When a block of foam clay during the solidification is cooled at some considerable rate, the heat transport from the inner part of the block to its surfaces requires that the temperature falls relatively rapidly towards the surfaces. The cooling process can be described mathematically for the following idealized and general case: A sheet at infinite length and breadth and uniform thickness, is cooled in such a way that the temperature is the same on each side of the sheet, and falls at an even rate. If the thermal coefficient of expansion and the coefficient of conductivity for heat do not depend upon the temperature and are constant through the thickness L of the block, the temperature profile across the thickness of the block will be parabolic. This can be calculated from the equation $$\lambda(\delta^2 T/\delta x^2) = \rho c \, dT/dt$$

where the $x$ axis is perpendicular to the sheet plane and the T axis is assumed to lie in this sheet plane. For constant values of $\lambda$ = coefficient of conductivity for heat, $\rho$ = density and $c$ = specific heat and $dT/dt$ = cooling rate in degrees per unit of time, this equation gives $$T = \rho c L^2/2 \, (dT/dt) \, [(x/L)^2 - x/L] + T_o$$

In a realistic case, where the block has a finite breadth and length, the influence of the four edge surfaces will affect the temperature profile in such a way that the profile, at all six surfaces, will become steeper than the parabolic profile.

In foam clay the coefficient of conductivity for heat will increase with temeprature increase due to the heat transport by radiation in the cells. This will also cause a flatter temperature profile in the middle part of the block and a steeper one at the surfaces, compared to the parabolic profile, particularly at higher temperatures.

When a block of a viscous material such as foam clay, is cooled through a temperature interval where the viscosity increases infinitely, the block will be tension free as long as the temperature distribution is unchanged. If the temperature in a volume element of the block is changed with the interval $\Delta T$, the thermal coefficient of expansion $\alpha$ will cause a change of the linear dimensions of the element by the factor $1 + \alpha \Delta T$. If this change is prevented, a tension sets up, which is proportional to the dimensional change $(1 + \alpha \Delta T)$ of the material, compared to the tension free condition. Accordingly the mechanical tension in each element in a block with symmetrical temperature distribution, is proportional to the difference between the temperature in the element and the temperature when the element is free from tensions. In order to secure balance, the average tension in the free block has to be zero.

This means that tensions will occur in a foam clay block where full temperature equalization after cooling has taken place, which tensions will be proportional to those temperature gradients, or in other words dependent upon that temperature distribution being present during the solidification. When the final temperature equalization takes place, i.e. when the outer surfaces reach the ambient temperature and the interior parts of the foam also is cooled down to this temperature, cracks occur because the residual tensions that remain after complete temperature equalization has taken place, are caused by the fact that the interior parts of the block has a higher temperature than its outer surfaces when solidification is finished. The residual tensions accordingly occur because the interior parts are to be cooled several degrees more than the outer parts after solidification and will therefore shrink relatively more. The effect is three dimensional.

Reduction of the residual tensions that result in such formation of cracks, is obtained according to the invention by equipping the block, during the cooling, with channels for continued cooling.

Thus, by equipping the block with cooling channels after the actual production process, a relatively rapid cooling down to handling temperature can be performed as a precaution against formations of cracks, which means that production of e.g. foam clay blocks becomes more economical. Hereby a new method has been procured, which make the attractive, and per se previously known, but hitherto not applicable foam clay blocks and similar elements, available as for instance house building elements.

Having knowledge of this information and the above given theoretical explanation it will be possible for skilled persons to practice alternative recipes based on at least two examples of performance, of which a preferred one in principle concerns equipping the block with channels before it is completely solidified in its interior part, and of which another one concerns equipping the block with channels after the solidifications but prior to temperature equalization at handling temperature takes place.

Figure 2:
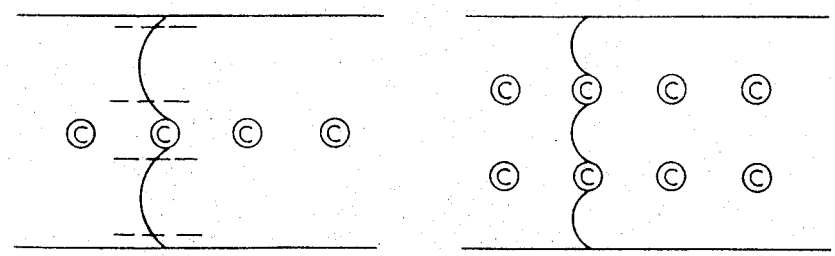
Figure 3:
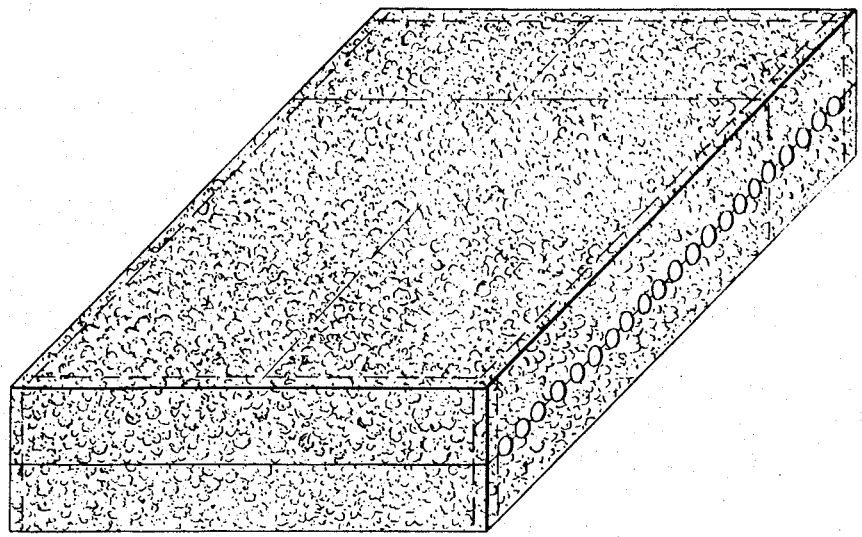

The invention will in the following be explained further by references to the figures, where FIG. 1 in principle shows temperature distribution through a one dimensional block without channels, FIG. 2 in principle shows temperature distribution through a one dimensional block having been equipped with channels before the interior of the block has been solidified, and FIG. 3 illustrates a block equipped with channels in a row and with different examples of parting the block for further reduction of tensions.

In FIG. 1 is shown an assumed, one dimensional block, i.e. an infinite large plate at uniform thickness. While this block is still somewhat viscous, a tension equalization will occur during the cooling, whilst, when the entire block has been solidified, an equalization of tensions will not take place any longer. If the block is assumed to be cooled at an even rate and uniformly from both sides, the temperature profile will, as indicated, be in the form of a parabola, and when the outer surfaces have reached handling temperature, a temperature equalization will start. If no precautions are taken when the block is cooled that rapidly, a continued contraction inwards in the block will result in formation of cracks, here indicated by S. Such crack formations are caused by a tension distribution corresponding to the temperature distribution during the solidification, with compressive stress in the surface layers, two neutral planes parallel to the surface, and tensile stress in the middle part of the block, corresponding to the sum of the compressive stresses. The picture is somewhat similar in the other two dimensions.

Precautions against formation of cracks, concerns as mentioned above, equipping the block with cooling channels after the actual productional process. In accordance with the preferred example, the block is equipped with channels before it is completely solidified in its inner part, in other words when the material has such a high viscosity that the block is dimensional stable by ordinary handling. This example is now to be further explained by means of a recipe for production of foam clay blocks that are free from cracks.

Production of foam clay blocks is previously known per see from the above mentioned patent specifications, and will consequently not be dealt with here, as far as the building up in a form, formation of a high viscous foam and stabilization by cooling is concerned. However, it is reminded that the productional conditions, as known, are somewhat varying from one clay type to another.

Stabilization of the pore structure usually occur, by most clay qualities, at a temperature of about 1,050° C, while solidification takes place at around 700° C. According to the preferred example, the cooling can be performed as fast as possible until the outermost parts of the block have been solidified, i.e until dimensional stability has been obtained. In succession hereto, the block is removed from the production kiln, and a drilling template with tubular, liquid cooled drills is being directed towards one of the block surfaces for drilling in planes parallel to the largest surfaces. During the drilling operations, still not solidified material is solidified locally around each drilling point end while being advanced into the material, without resulting in complete solidification of the inner part of the block. This results in an abrupt temperature profile through the cross section of the block, compared to what is shown in FIG. 1.

Immediately after the drilling operation, the block is transferred to the cooling kiln, and cooling air at 720° C is conducted through the channels. Additionally a flow of cooling air at the same temperature is conducted alongside the block to obtain the same temperature along the surfaces of the block as along the channel walls, as indicated in FIG. 2 where c denotes the channels. The purpose of this flow regulations is to obtain such a temperature distribution through the cross section of the block, with reference to the channel positions, that the thermal residual tensions which occur when temperature equalization at handling temperature takes place, becomes lower than the tensions which otherwise would lead to formation of cracks. The exact recipe data can only be found experimentally by testproduction of one or more blocks, because the types of clay are different, as mentioned above, and because such data depend on the block sizes.

As a general indication related to one block dimension of 2.70×1.20×0.25 meters, it is informed that a cooling gas rate of 4–5 m/sec is suitable, until temperature indicators show that the gas flowing out from the channels no longer is hotter than the gas which has passed along the side surfaces a distance corresponding to the length of each channel. Thereafter a cooling rate is maintained, being proportional to the heat conductivity of the foam material, whereby the established temperature distribution is maintained approximately unchanged until temperature equalization at ambient temperature takes place. The actual recipe is to be found experimentally as already mentioned, and is determined once for all for the same type of clay, block size and productional plant. It is further informed, that the cooling rate after the establishment of the desired temperature distribution, at the moment of total solidification, may be so high that crack formation due to temporary tensions will almost occur.

The drilling equipment may be of a known type, or similar to that which is described in U.S. Pat. application Ser. No. 142,990. Here shall only be stated that in case a block of the above mentioned size is to be treated, each drill may have a diameter of about 40 mm, and that the distance between each drill in one plane ought to be somewhat lesser than 100 mm to secure an acceptable temperature distribution when applying the recipe given above.

As stated above, the block may alternatively be equipped with channels after the solidification, but this alternative will not nearly have the same effect, because the temperature distribution which determines the tension distribution has already been established during the solidification. However, the channel equipment after solidification will nevertheless be attached to the advantage that the cooling rate can be increased at least somewhat more than it could without channels, thus preventing cracks due to temporary tensions. The requirement hereto, is that the block is equipped with channels before temperature equalization has taken place.

Carefully the block can also be equipped with channels during the proper solidification, and then such that the channel equipment also contributes in determining the establishment of the desired temperature profile which the block shall be given in the very solidification interval.

Equipping a block with channels is intended to include arrangement of dummies for channels during the charging of clay before or during bloating, e.g. in the form of tubes made from ceramic materials, which tubes are kept closed until cooling by means of these shall be performed according to the invention, namely after the block has passed the actual productional stages.

The channels can be arranged in all three planes, but in case of blocks for house wall elements, it is sufficient to arrange the channels parallel to the large sides of the elements, preferably through the middle parts. The channels may, e.g. be used as bushings for i.a. tubes, electrical cables etc. The block may also be parted into smaller elements, as indicated in FIG. 3 and described in Norwegian Pat. application No. 1972/70. The parting can be performed along a channel row.

I claim:

1. A method for producing elements of inorganic foam material from a material selected from the group consisting of argillaceous material, glass powder, aggregates thereof and slag, comprising heating said material to fusion and expansion to form a block, and then cooling the block, the improvement therein comprising forming internal cooling channels in said block after the block has achieved dimensional stability, then passing a cooling gas along the side surfaces of the block and through said channels until the channel walls have reached substantially the same temperature as said surfaces, and continuing the cooling at a cooling rate which is kept substantially proportional to the heat conductivity of the foam material, until temperature equalization at ambient temperature takes place.

2. A method as claimed in claim 1 wherein said block is equipped with channels before it is completely solidified in its interior part.

3. A method as claimed in claim 2 wherein said block is equipped with channels simultaneously as it is discharged from a productional kiln, and then transferring said block immediately thereafter to the cooling kiln for controlled cooling.

4. A method as claimed in claim 2 wherein said channels are flushed with air at the same temperature as the air by which the surfaces of said block are cooled.

5. A method as claimed in claim 1 wherein said block is equipped with channels after the solidification thereof but before temperature equalization at handling temperature has taken place.

6. A method as claimed in claim 1 wherein said block is eiupped with channels after solidification of its outer parts by means of tools which are kept at such a temperature that the inner part of the block solidifies locally around said tools without resulting in complete solidification of the inner part of said block.

* * * * *